No. 620,507. Patented Feb. 28, 1899.
W. H. SEWELL.
PNEUMATIC TIRE FOR CYCLES.
(Application filed Dec. 27, 1897.)
(No Model.)
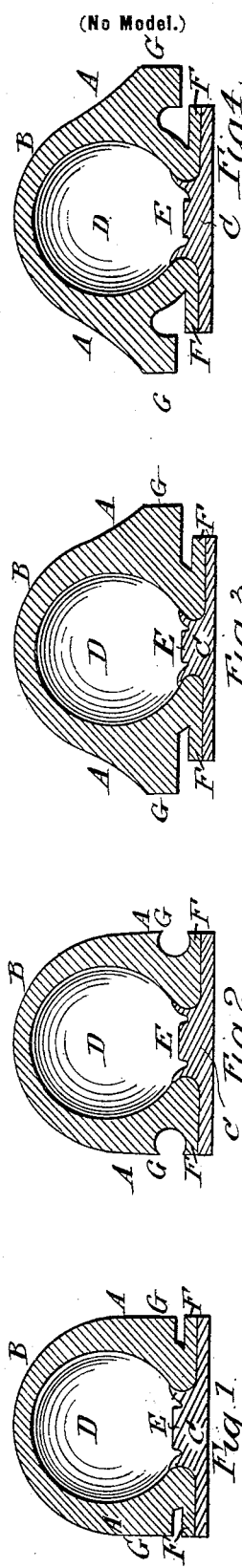
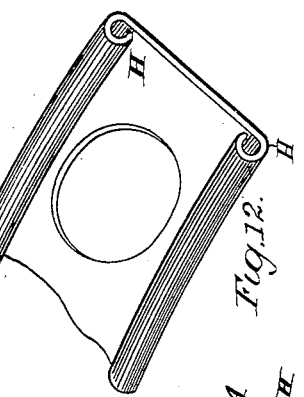
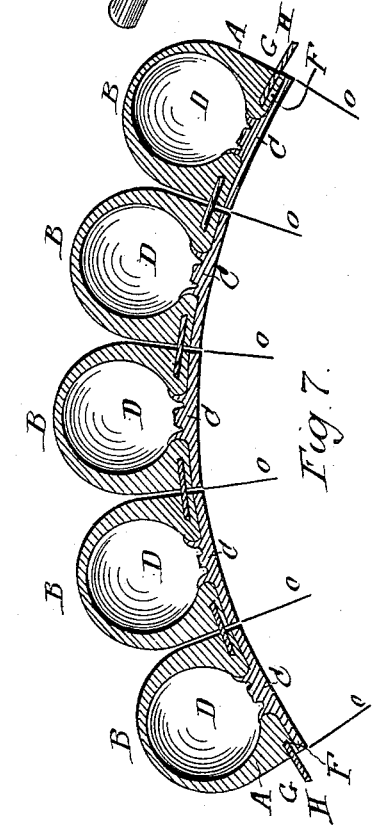
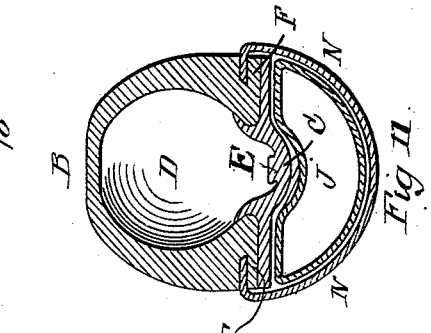
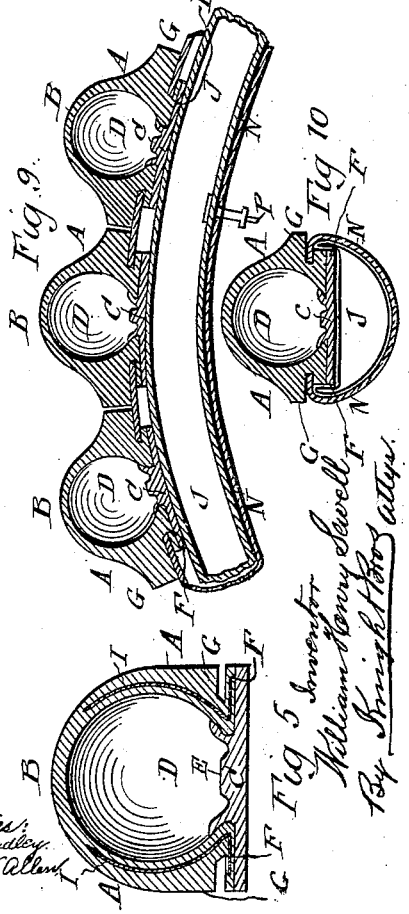
THE NORRIS PETERS CO., PHOTO-LITHO., WASHINGTON, D. C.

UNITED STATES PATENT OFFICE.

WILLIAM HERBERT SEWELL, OF PORT STEWART, IRELAND.

PNEUMATIC TIRE FOR CYCLES.

SPECIFICATION forming part of Letters Patent No. 620,507, dated February 28, 1899.

Application filed December 27, 1897. Serial No. 663,727. (No model.)

*To all whom it may concern:*

Be it known that I, WILLIAM HERBERT SEWELL, general produce merchant, a subject of the Queen of Great Britain, and a resident of Westcliff House, Port Stewart, Ireland, have invented certain new and useful Improvements in and Connected with Pneumatic Tires for Cycles, Carriages, and other Vehicles, of which the following is a specification.

According to my invention I propose to construct the pneumatic tires of cycles, carriages, and other vehicles more in consonance with the laws and forces governing a running wheel, while at same time more simple in construction, more durable, and affording greater comfort to the rider by more perfectly absorbing vibration than any of the pneumatic tires at present in use.

In carrying my invention into effect the tread or running face of the wheel is composed of a series of separate and hollow-chambered sections of rubber or the like distensive and flexible material or a combination of rubber and other material, the said sections being attached to or supported by a flange bearing on the inside of the outside or ground face of a metal or wooden rim, which latter is provided with suitable nests or openings to receive and securely hold the said flanged sections. The sections may be of differing shapes on outside—such as spherical, spheroidal, or cycloidal, or a modification of any of these forms; but their interior or hollow chamber will be of as nearly a spherical form as possible, and this hollow will be filled with air or gas at such pressure as desired. The construction of these sections is special and peculiar, viz: What may be called their "side wall" will be thickened or it may be strengthened by a band or belt of a rigid or nonstretching material in order to prevent transverse and longitudinal expansion, while the running apex and its inner wall will be left flexible and distensive, so that compression or deformation of either of these points will readily cause them to yield to or affect each other.

In the case of the running apex of sections being any considerable distance apart the thickened side walls may be lengthened or elongated, so as to form a cushion and prevent loose road metal and such like jarring or coming into contact with the ground face of the rim between the running-points.

It will be obvious that in a wheel making its revolution on the flexible points of above-described inflated sections the waves of resilience in each point necessarily produced by the vibration and deformation of ground contact will be perpendicular and therefore concentrated on or against the expansive inner wall, producing a perfect suspensory seat for the vehicle or rider, and, further, the sharp contraction or rebound of the distended inner wall on the segment being relieved from pressure must react on the running apex and produce an impetus in line of motion.

A modification of foregoing tire would be that for heavy work and over rough roads I may have the before-mentioned sections backed by a pneumatic tube or densified air-chamber. This may be readily effected by the use of a hollow or concave rim, which would be in itself air-tight or would inclose a continuous or circumferential flexible air-tube. In this case the inner or perpendicular expansion of the inner wall of the segments would be into or against a pneumatic background and the density of the ground-tread be largely controlled by the density of the buffer, (tube or chamber.) Thus the wheel would be provided with a multiplied pneumatic chamber or vibration absorbent.

Each of the running sections may be made with a double or divided flange. The inner flange is the bearing or attachment flange, while the outer or under flange will prevent section being pushed up through or into rim and also obviate any tendency to side roll.

I will now describe my invention, reference being made to the accompanying drawings.

Figures 1, 2, 3, and 4 are axial sections of differing forms of segments. Figs. 5 and 6 are axial sections of differing forms of segments having differing forms of strengthening-strips. Fig. 7 is a vertical longitudinal section of a part of a wheel-rim provided with a series of segments of the form shown in Fig. 1. Fig. 8 is a transverse section of the same, taken axially through one of the segments thereof, showing the effect of pressure on the apex of the latter. Fig. 9 is a vertical longitudinal section of a part of a tubular wheel-rim provided with a series of segments of the form shown in Fig. 3. Fig. 10 is a transverse section taken axially through one of the segments thereof. Fig. 11 is a similar view showing the effect of pressure on the apex of the segment. Fig. 12 is a perspective view showing a segment of the wheel-rim.

Referring to Figs. 1, 2, 3, and 4, which show cross-sections of some of the differing forms of segments and the peculiarities of construction of same, A is the thickened or strengthened side wall in which lateral expansion is confined, B is the thinner running apex or tread of same, and C its inner wall, which latter is preferably composed of a more elastic quality of rubber than remainder of segment. D is the hollow and spherical air-chamber, and E is a small button or piece of self healing or closing rubber, through which the segments can be inflated by a needle inflator or injector. F is the attachment or bearing flange, which is inserted into and bears on the under side of rim-face, and G is the buffer-flange spoken of as desirable for protection of outer side of rim-face, which may be elongated, as shown in Figs. 3 and 4, when the segmentary treads or running-points are spaced at any considerable distance apart.

In some instances, or, if desired, I might have an embodiment of canvas or such like non-stretching material I in side walls of segments or I might have them lined with a similar non-stretching material with exception of the inner wall, the canvas or other material being for the purpose of more effectually controlling lateral expansion and increasing rigidity in side walls, as seen in Figs. 5 and 6.

Referring to Fig. 7, which is part section and part elevation of part of wheel-rim fitted with the segmentary tire and which illustrates one form of my invention, it will be observed that the inner wall of each segment is open and unconfined to admit of free perpendicular expansion. The amount of this expansion will of course vary according to the weight carried and elasticity of inner wall, and it is in effect an unpaid-for storage of power, which will on its contraction or rebound as segment escapes from ground contact or pressure be given out and provide an impetus in line of motion. The free perpendicular expansion also secures an absolute suspensory seat for vehicle and rider.

H is the metal or wooden rim, (more particularly shown in Fig. 12,) and O are the spokes of wheel.

Figs. 8 and 11 are cross-sections of segments, showing the effects of pressure on or deformation of the running apex B of segment in actual ground contact as well as the effect of same on the expansive inner wall C.

Referring to Figs. 9 and 10, it will be seen that the segments are fitted into a tubular formation of rim N, within which is placed a circumferential and elastic air-tube J, fitted with an inflating and deflating air-valve P. In this case the perpendicular expansion of running-segments will be into or against the said air-tube J and will be automatically regulated by density of same. The wheel is thus provided with a multiplied pneumatic chamber and vibration absorbent.

Having now particularly described and ascertained the nature of my said invention and in what manner the same is to be performed, I declare that what I claim is—

1. A segment for pneumatic tires, formed with a hollow chamber with a thickened side wall, with a yielding apex or tread thinner than the side wall, with a yielding inner wall, with a bearing-flange, and with a buffer-flange; substantially as described.

2. A segment for pneumatic tires, formed with a hollow chamber, with a thickened side wall, with a bearing-flange, with strengthening-strips in connection with the side wall, with an inner wall, with a bearing-flange, and with a buffer-flange; substantially as described.

3. A wheel comprising a tubular rim, a yielding tube within the rim, and a pneumatic segment formed with a hollow chamber, with a thickened side wall, with a yielding apex or tread, thinner than the side wall, and with a yielding inner wall bearing against the yielding tube; substantially as described.

In testimony whereof I have signed my name to this specification in the presence of two witnesses.

WILLIAM HERBERT SEWELL.

Witnesses:
JOHN LIDDLE,
EDITH MARY EDMONDSTONE.